Electronic Tuning Voltage Generator 190

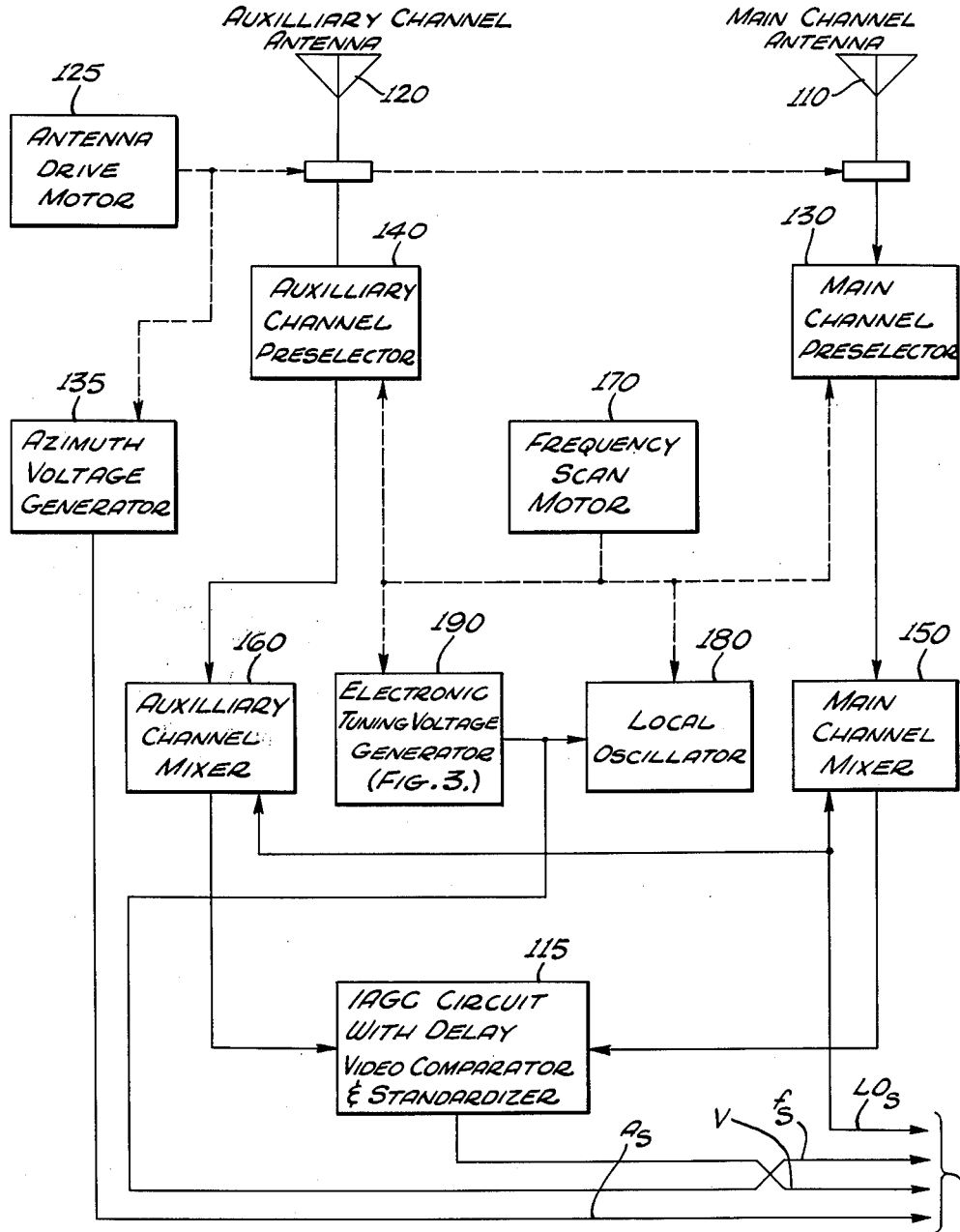

United States Patent Office 3,021,523
Patented Feb. 13, 1962

3,021,523
SYSTEM FOR COUNTERMEASURES
Donovan C. Davis, Pasadena, and Paul M. Brown, East Whittier, Calif., assignors to Gilfillan Bros., Inc., Los Angeles, Calif., a corporation of California
Filed Sept. 19, 1956, Ser. No. 611,809
4 Claims. (Cl. 343—18)

This invention relates to countermeasures indication systems, and more particularly to means for simultaneously displaying indicia representing the frequency to which a friendly tracking receiver is tuned, the direction of radiation of a friendly jammer, and the angular position and transmission frequency of an enemy source of radiant energy.

In manual frequency and position tracking systems often used with countermeasures receivers, it is necessary to display visually the position and transmission frequency of each enemy radar operating within an assigned surveillance volume in order that a system monitor or operator may quickly determine the presence of any enemy radar and jam it. It is also well known that the transmission frequency and angular position of the enemy radar must be registered in order that an associated directional jammer antenna may be appropriately positioned and a jammer transmitter may be suitably tuned to effect efficient jamming of the enemy radar. In order to track the position and frequency of an enemy radar transmitter manually, it is also necessary to display the transmission frequency and antenna position of the jammer simultaneously with the position and frequency data of enemy radars.

The present invention provides a solution to this problem in a system for countermeasures including a searching receiver having means for producing first and second output signals with amplitudes, respectively, changing in proportion to the angular position of a searching receiver directional antenna and the frequency to which the searching receiver is tuned, one of the searching receiver output signals having a period short in comparison to that of the other, the system including at least a tracking receiver having an output signal representative of the frequency to which the tracking receiver is tuned and a jammer having an output signal representative of the angular position of its directional antenna. The indication system of the invention is preferably employed with a cathode-ray type indicator having an evacuated envelope and an electron gun at one end of the envelope, a luminescent screen at the other end of the envelope, and first and second deflection means for deflecting the cathode-ray across the luminescent screen in two different directions, e.g. vertically and horizontally.

In accordance with the invention the arrangement for deflecting the cathode-ray of the indicator comprises means for generating a fly-back gate approximately at the end of at least one period of the searching receiver output signal, means for producing a sample signal proportional to the amplitude of the said one output signal at a time during the one period that the amplitude of the one searching receiver output signal is proportional to the magnitude of a corresponding one of the tracking receiver and jammer output signals, means for storing the second signal until the fly-back gate is generated, means for applying only the one searching receiver output signal to the first cathode-ray deflection means between the times that the fly-back gate is generated and for applying only the stored sample signal to the first deflection means only during the time that the fly-back gate is generated, means for generating a sweep voltage having a period substantially equal to that of the fly-back gate, means for applying the sweep voltage to the second deflection means, the sweep voltage having a range sufficiently large to sweep the cathode-ray of the indicator over a substantial portion of the luminescent screen, means for additionally applying the other searching receiver output signal to the second deflection means, and means for gating the cathode-ray of the indicator on only when the searching receiver receives input signals, when the fly-back gate is generated, and when the amplitude of the other searching receiver output signal becomes proportional to the magnitude of the other of the corresponding tracking receiver and jammer output signals.

In accordance with the invention preferably the second output signal of the searching receiver is employed to represent the frequency to which it is tuned. This signal preferably has a periodic nature, the period of which is short in comparison to the period of the first output signal, which, then, is employed to represent the angular position of the searching receiver antenna. Preferably the means for producing the sample signal includes means to produce a coincidence gate to sample the second output signal of the searching receiver at the time it is generated. This coincidence gate is generated with local oscillators of both the searching receiver and jammer when the frequencies of each are within the same relatively narrow frequency band.

According to a feature of the invention, the local oscillator coincidence gate is generated by means including a mixer for combining the local oscillator signals from both the searching receiver and the jammer, and a network connected from the mixer having a relatively narrow pass band to produce a relatively high amplitude output signal when the frequency of the searching receiver is nearly equal to that of the tracker local oscillator. In this case, the searching receiver may be employed to search for enemy radar both in frequency and in direction. Hence, the tracker local oscillator frequency will be relatively constant and the searching receiver local oscillator frequency will be varying, for example, increasing or decreasing linearly within a predetermined range.

It is therefore an object of the invention to provide means for displaying indicia representing the frequency of a friendly tracking receiver and the direction of radiation of a friendly jammer with indicia representing the angular position and transmission frequency of an enemy radar transmitter.

It is another object of the invention to provide an arrangement for deflecting the cathode-ray of an indicator across a luminescent screen incorporated in the indicator in a manner to display indicia representing the frequency and position of an enemy radar transmitter as a function of its position, to generate a strobe line representing the frequency to which a friendly tracking receiver is tuned, and to generate a strobe line representative of the angular position of a friendly jammer.

It is still another object of the invention to provide means to generate a gating signal when the frequency of a variable frequency alternating signal becomes substantially equal to that of a substantially fixed frequency alternating signal.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

FIG. 2 is a more detailed block diagram of a searching receiver shown in FIG. 1;

Figure 1:
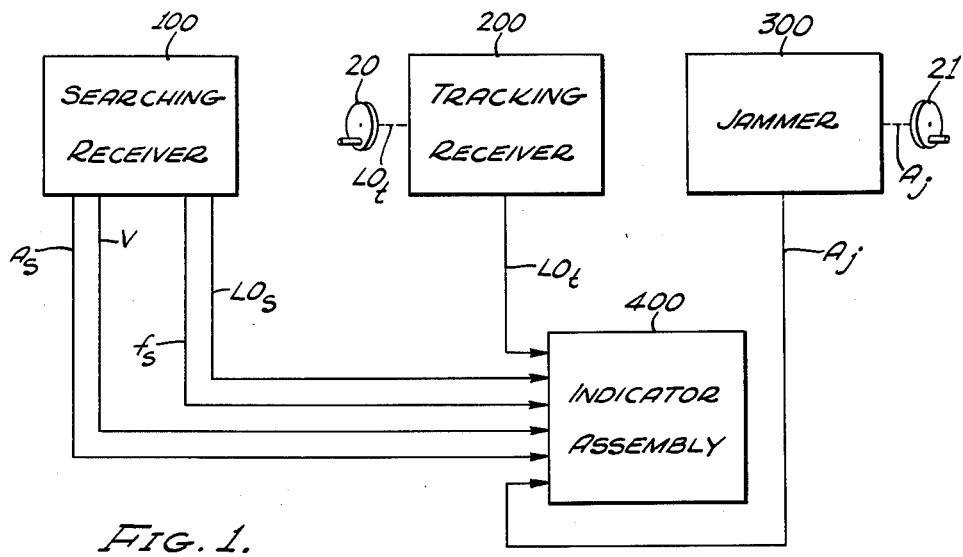
FIG. 1 is a block diagram of a system for countermeasures including an indicator assembly constructed in accordance with the present invention.

In the drawings in FIG. 1 a searching receiver 100 with a tracking receiver 200 and a jammer 300 are shown providing several inputs to an indicator assembly 400 for a system for countermeasures including the searching and tracking receivers 100 and 200, the jammer 300 and the indicator assembly 400. Preferably the searching receiver 100 produces the output signals displayed in the indicator assembly 400 so that the local oscillator frequency designated $LO_t$ may be manually adjusted by means of a handwheel 20 to initiate automatic frequency control in the tracking receiver 200 and to heterodyne down the transmitter frequency of an enemy radar to a frequency within the intermediate frequency pass band of the tracking receiver intermediate frequency amplifiers. A similar handwheel 21 is provided with the jammer 300 to adjust the angular position of the jammer antenna (not shown). The jammer antenna is, of course, preferably directional. The jammer however may be employed to jam all radio frequency signals within a relatively large band. Tracking receiver 200 is provided with the output signal $LO_t$ which is the output of the tracking receiver local oscillator. The jammer 300 provides an output signal $A_j$ which is representative of the angular position of the jammer directional antenna. Both the signals $LO_t$ and $A_j$ are impressed upon the indicator assembly 400.

Searching receiver 100 produces four other signals which are also impressed upon the indicator assembly 400. These signals are local oscillator signal $LO_s$, a signal representative of the frequency of $LO_s$ or $f_s$, signals representative of the video received by the searching receiver 100 and designated generally as V, and a signal representative of the angular position of a directional antenna included in the searching receiver 100. The signal representative of the angular position of the searching receiver directional antenna is generally designated $A_s$.

The searching receiver 100 is shown in FIG. 2 comprising main and auxiliary channel antennas 110 and 120, main and auxiliary channel preselectors 130 and 140, and main and auxiliary channel mixers 150 and 160. The auxiliary channel antenna is employed to reduce all signals received through the main channel antenna 110 to substantially zero unless they are received through the main lobe of the main channel antenna 110 which is directional. Searching receiver 100 is tuned by means of a frequency scan motor 170 which is mechanically connected to the main and auxiliary channel preselectors 130 and 140 and to a local oscillator 180 and an electronic tuning voltage generator 190.

The local oscillator 180 may be a klystron type local oscillator with the electronic tuning voltage generator 190 producing an output voltage which is applied to the repeller of the klystron local oscillator 180. This voltage is representative of the output frequency of the local oscillator 180. Side lobe video of the main channel antenna 110 is cancelled in an IAGC circuit which incorporates a delay, a video comparator and a standardizer indicated generally at 115. The outputs of main and auxiliary channel mixers 150 and 160 are thus combined in this IAGC circuit 115.

Preferably auxiliary channel antenna 120 is not omnidirectional. For this reason it is preferably driven synchronously in azimuth with main channel antenna 110 by an antenna drive motor 125. The antenna drive motor 125 also drives an azimuth voltage generator 135 which may simply be a potentiometer having an output proportional to the angular positions of the main and auxiliary channel antennas 110 and 120. Searching receiver 100 is described in greater detail in copending application Serial No. 596,131 filed July 2, 1956, entitled "Radiant Energy Receiver System" filed by Donovan C. Davis and Paul M. Brown, now Patent No. 2,938,206, issued May 24, 1960.

The output of searching receiver 100 thus is the output of local oscillator 180 or $LO_s$, the output of electronic tuning voltage generator 190 or $f_s$, the video output of the IAGC circuit 115 or V, and the output of azimuth voltage generator 135 or $A_s$.

Figure 3:
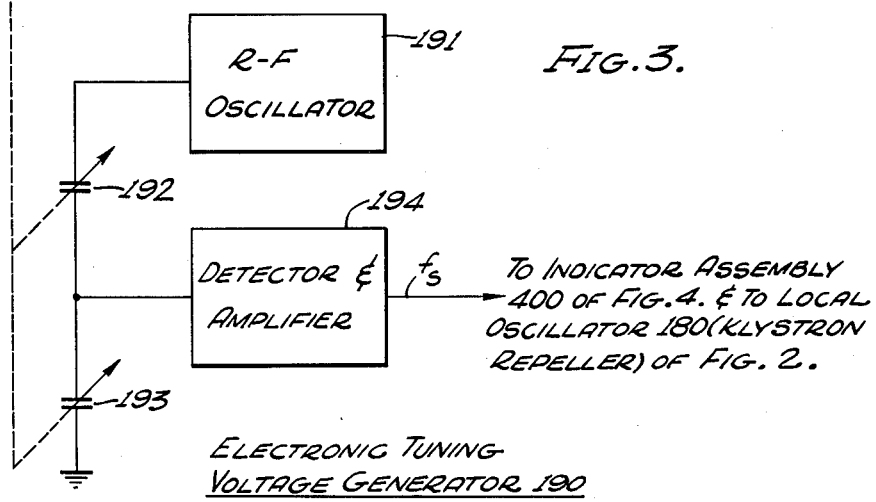
FIG. 3 is a still more detailed schematic diagram of an electronic tuning voltage generator shown in FIG. 2.

The electronic tuning voltage generator 190 may be conventional as shown in FIG. 3 including an RF oscillator 191, a pair of variable tuning capacitors 192 and 193 mechanically connected from the frequency scan motor 170 and a detector amplifier 194 connected from the mutual junctions of the capacitors 192 and 193. Preferably the electronic tuning voltage generator 190 is constructed as shown in FIG. 3 because of the unusually high rate of change of the signal $f_s$ required of the electronic tuning voltage generator 190.

Figure 4:
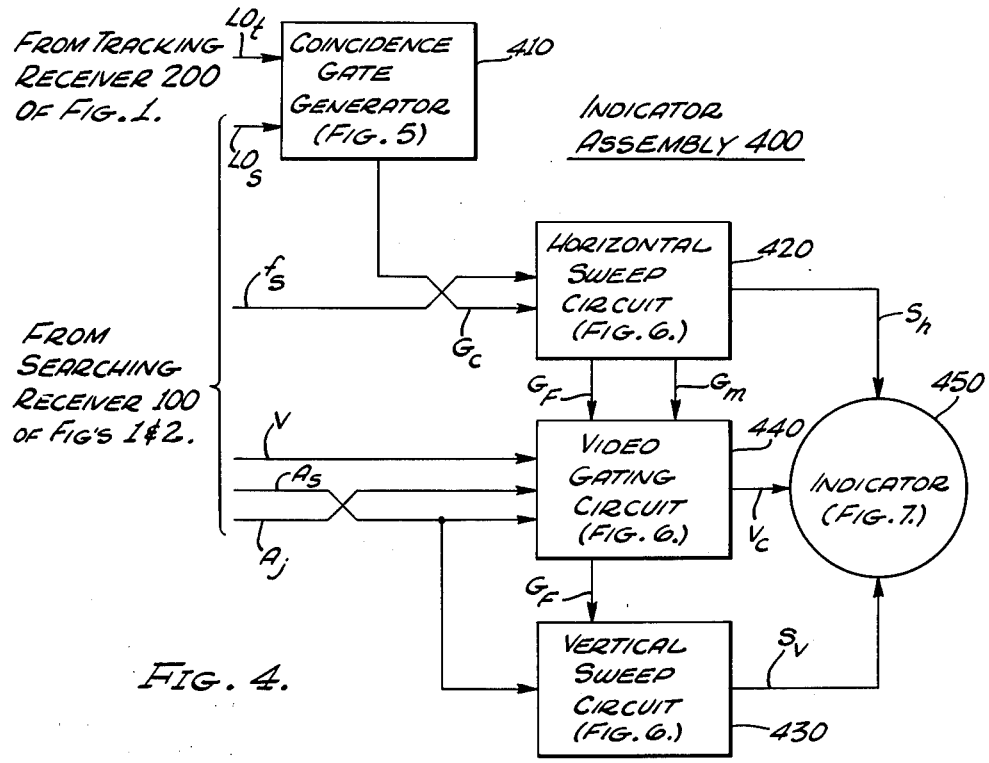
FIG. 4 is a detailed block diagram of an indicator assembly shown in FIG. 1.

Indicaor assembly 400 is shown in FIG. 4 comprising a coincidence gate generator 410, a horizontal sweep circuit 420, a vertical sweep circuit 430, a video gating circuit 440, and an indicator 450.

Coincidence gate generator 410 is employed to generate a coincidence gate $G_c$ when the signal $LO_s$ is produced by local oscillator 180 shown in FIG. 2 and is substantially equal to that of the signal $LO_t$ produced by the local oscillator in the tracking receiver 200 shown in FIG. 1. The coincidence gate $G_c$ with the frequency representative signal $f_s$ produced by the electronic tuning voltage generator 190 shown in FIG. 2 is impressed upon the horizontal sweep circuit 420 to produce a special type of horizontal sweep voltage to sweep the cathode-ray of the indicator 450 in a particular manner. The waveform of the horizontal sweep voltage indicated generally as $F_h$ will be hereinafter discussed more fully with the particular component parts of the horizontal sweep circuit 420. In accordance with the invention, use is made of a particular combination of conventional circuits to produce the coincidence gate $G_c$ in the coincidence gate generator 410.

Preferably the signal $f_s$ is substantially sawtooth in shape. During the fly-back time of the signal $f_s$ preferably a fly-back gate $G_F$ is generated in the horizontal sweep circuit which is utilized therein and also in both the vertical sweep circuit 430 and the video gating circuit 440. The video gating circuit 440 impresses all video which is preferably standardized to intensity modulate the cathode-ray of the indicator 450. Video gating circuit 440 is responsive to the fly-back gate $G_F$ and also a gate $G_M$ which is employed to generate a standardized frequency strobe gate in the video gating circuit 440. The video gating circuit is also responsive to the video output V of the searching receiver 100, the angle antenna position signals $A_s$ of the searching receiver 100, and the antenna position signal $A_j$ of the jammer 300 shown in FIG. 1.

The output of the video gating circuit 440 is labeled $V_c$ and represents the composite video of the video V and all the display gates generated within the video gating circuit 440. The composite video $V_c$ is thus employed to intensity modulate the cathode-ray indicator 450. The vertical sweep circuit produces a vertical sweep voltage $S_v$, the waveform of which will be described in detail hereinafter. The vertical sweep circuit comprises several conventional component parts which will also be described in detail hereinafter. The vertical sweep circuit produces the vertical sweep voltage $S_v$ in response to reception of the searching receiver antenna angular position $A_s$ and the fly-back gate $G_s$ produced by a fly-back gate generator, not shown in FIG. 4, incorporated in the horizontal sweep circuit 420.

Figure 5:
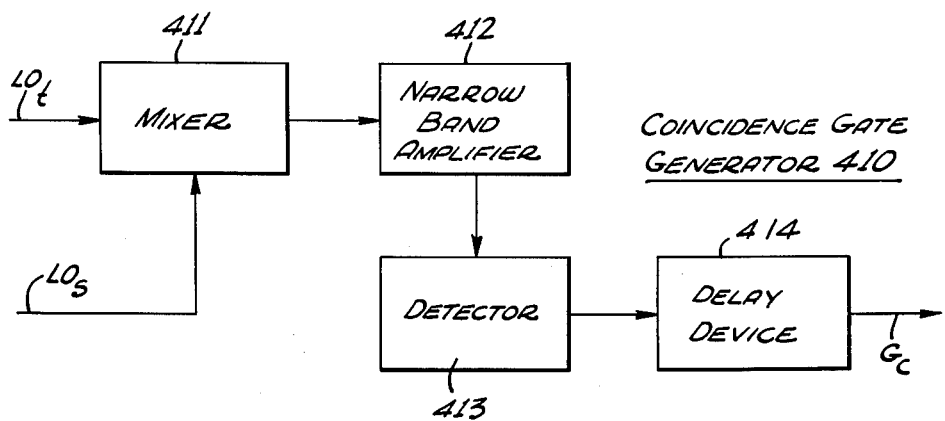
FIG. 5 is a detailed schematic diagram of a coincidence gate generator shown in FIG. 4.

The coincidence gate generator 410 is shown in FIG. 5 comprising a mixer 411 responsive to the tracking receiver local oscillator $LO_t$ and the searching receiver local oscillator receiver $LO_s$. The output of the mixer 411 is introduced to a narrow band network or amplifier 412, the output of which is passed through a detector 413 and a delay device 414 to compensate for the delay produced in the IAGC circuit 115 shown in the searching receiver 100 in FIG. 2. The output of the delay device thus is the coincidence gate $G_c$. The operation of the coincidence gate generator 410 may be explained in analogy to a pair of apertured plates having a light beam trained on one aperture of a stationary plate. As the aperture of the other and movable plate passes over the aperture of the fixed plate, the light beam may shine through. Thus the narrow band amplifier 412 provides a gated output as the local oscillator signal $LO_s$ increases to the frequency of the tracking receiver local oscillator signal $LO_t$ and passes it. That is, when the difference between the frequencies of the signals $LO_s$ and $LO_t$ is approximately equal to the band width of the narrow band amplifier 412, a square wave or gate output is produced by the narrow band amplifier 412.

Figure 6:
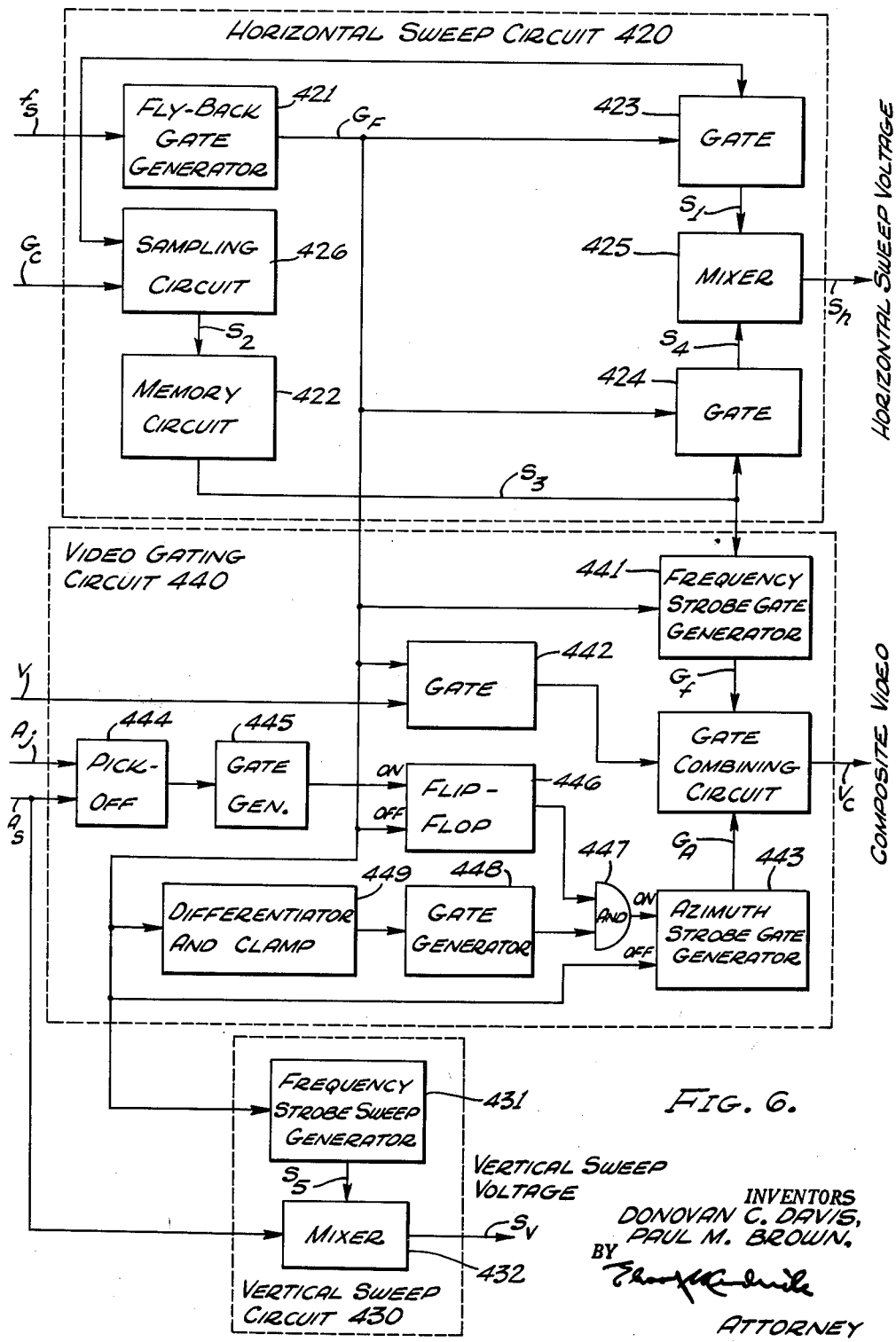
FIG. 6 is a detailed block diagram of the video gating and sweep circuits shown with an indicator in FIG. 4.

The horizontal and vertical sweep circuits 420 and 430 are shown with a video gating circuit 440 in FIG. 6. The horizontal sweep circuit 420 comprises a fly-back gate generator 421 for producing the fly-back gate $G_F$. The fly-back gate $G_F$ is employed to pass the frequency representative signal $F_s$ and the output $S_3$ of a memory circuit 422 alternately through a pair of corresponding gates 423 and 424, respectively. The outputs of the gates 423 and 424, respectively, are indicated as $S_1$ and $S_4$. The outputs $S_1$ and $S_4$ are impressed upon a mixer 425, the output of which is the horizontal sweep voltage $S_h$. The coincidence gate $G_c$ is impressed upon a sampling circuit 426 on which the frequency representative signal $F_s$ is also impressed. Sampling circuit 426 samples the output signal amplitude of the frequency representative signal $F_s$ whenever the coincidence gate $G_c$ is generated. This sample signal is represented at the output of sampling circuit 426 by $S_2$ which is impressed upon memory circuit 422. Memory circuit 422 supplies amplitude memory for the signal $S_2$ which is presented as the horizontal sweep voltage $S_h$ through gate 424 and mixer 425 whenever the fly-back gate $G_F$ is generated. The frequency representative signal $F_s$ is passed normally through gate 423 and mixer 425 normally only when the fly-back gate $G_F$ is not generated.

The signal $S_3$ which corresponds to $G_n$ shown in FIG. 4 is impressed upon a frequency strobe gate generator 441 in the video gating circuit 440 with the fly-back gate $G_F$. The frequency strobe gate generator 411 is then employed to generate a standard gate $G_f$ whenever the fly-back gate $G_F$ is generated and when signal $S_3$ is greater than zero. Video gating circuit 440 is also provided with a blanking gate 442 which is employed to blank out the searching receiver video V from the composite video $V_c$ whenever the fly-back gate $G_F$ is generated, the fly-back gate $G_F$ being impressed upon gate 422 with the searching receiver video V. An azimuth strobe gate generator 443 is employed to produce an azimuth strobe gate $G_A$ at a time during which the gate 423 in the horizontal sweep circuit 420 is open, i.e. when fly-back gate $G_F$ is not generated. A pick-off pulse is generated by pick-off 444 as the changing, for example, according to a sawtooth waveform of the signal $A_s$ to the substantially constant signal level of the jammer antenna azimuth position $A_j$. Each pulse from the pick-off 444 is then standardized into a gate by gate generator 445 which is employed to operate a flip-flop 446. The output of the flip-flop is then impressed upon and gate 447 which produces an output pulse on azimuth strobe gate generator 443 when an output pulse is received from a gate generator 448 having an input from a differentiator and positive clamp 449 responsive to the fly-back gate $G_F$. Both the flip-flop 446 and the azimuth strobe gate generator 443 are preferably bistable multivibrators, each of which are turned off by the fly-back gate $G_F$. The gating arrangement for the azimuth strobe gate generator 443 is preferably provided so that the display gate $G_A$ will be presented during a sweep of the frequency representative signal $F_s$ immediately following the time that the azimuth representative signal $A_s$ becomes equal to the other azimuth representative signal $A_j$.

The vertical sweep voltage $S_v$ produced by the vertical sweep circuit 430 is produced simply by means of a combination of the searching receiver antenna azimuth position signal $A_s$ and the output $S_5$ of the frequency strobe sweep generator 431, both the signal $S_5$ and $A_s$ being impressed upon a mixer 432 which produces the vertical sweep voltage $S_v$ as a combination of the signals $S_5$ and $A_s$. The frequency strobe sweep generator is employed to sweep the cathode-ray of the indicator 450 shown in FIG. 4 in a vertical direction across the luminescent screen of the tube, not shown in FIG. 4.

Figure 7:
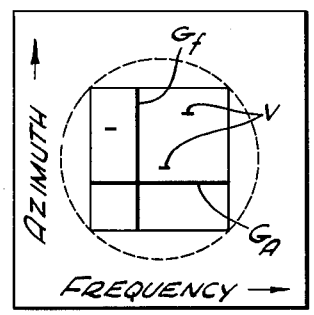
FIG. 7 is a view showing the display produced by the indicator of FIG. 4.
Figure 8:
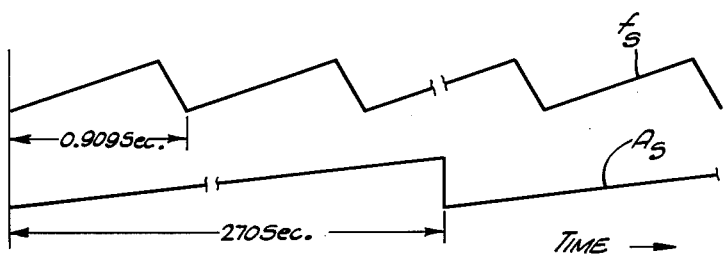
FIGS. 8, 9, 10 and 11 are graphs of waveforms characteristic of the operation of the indicator assembly shown in FIG. 4.

The display of the indicator 450 is shown in FIG. 7 where the searching receiver video V is displayed in the form indicated as V, a frequency strobe line is indicated as $G_F$ and an azimuth strobe line is indicated as $G_A$. The horizontal position of the frequency strobe line $G_F$ is representative of the frequency of a tracking receiver 200 shown in FIG. 1. The vertical position of the azimuth strobe line $G_A$ is representative of the angular position of the antenna of the jammer 300 shown in FIG. 1. Each of the illuminated portions V is representative of both the azimuth and frequency of an enemy radar transmitter. Preferably the length of the lines V shown in FIG. 7 are substantially equal, they being standardized in a video standardizer in the IAGC circuit 115 shown in the searching receiver 100 in FIG. 2. The output signal $LO_t$ of the tracking receiver 200 is a substantially constant amplitude and frequency radio frequency signal, the frequency of which is variable only with the handwheel 20 shown in FIG. 1. The searching receiver local oscillator signal $LO_s$ is preferably a linear frequency varying radio frequency signal, and the azimuth output $A_j$ of the jammer antenna is preferably simply a substantially constant direct current signal, variable only with the handwheel 21 shown in FIG. 1. The coincidence gate $G_c$ is generated, as explained previously, when the frequencies of the signals $LO_s$ becomes approximately equal to that of the signal $LO_t$. The waveforms of the signals $S_s$ and $A_s$ are shown in FIG. 8. It is to be noted that the frequency representative signal of the frequency of the searching receiver local oscillator is substantially short in comparison of the period of the azimuth representative signal $A_s$. For example, the period of the frequency representative signal may be 0.909 second whereas the period of the azimuth representative signal $A_s$ may be 270 seconds.

Figure 9:
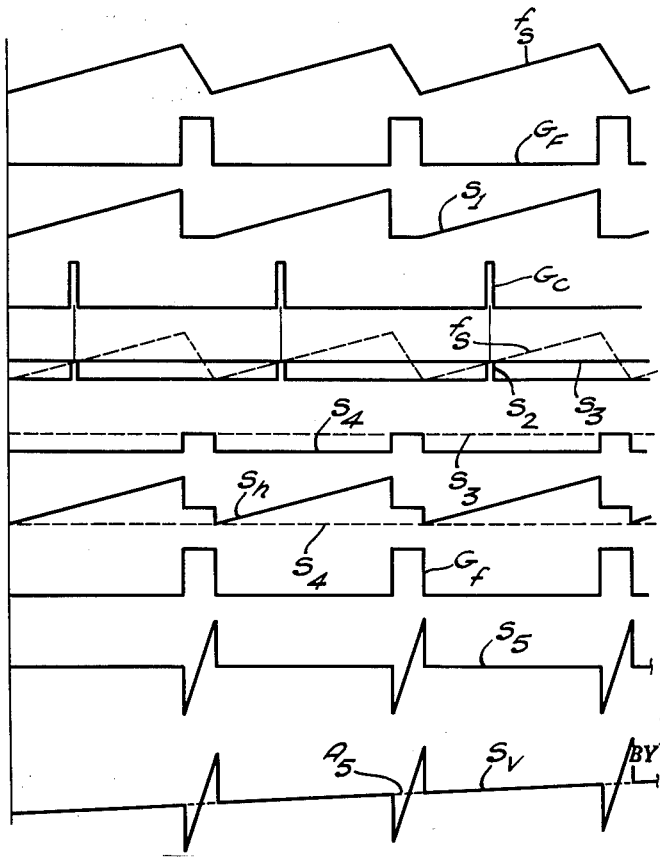

The waveform of the fly-back gate $G_F$ in its relative position with respect to the frequency representative signal $F_s$ is shown in FIG. 9. The output of gate 423 is also shown as $S_1$ directly below the fly-back gate $G_F$. $G_c$ may be generated at any particular time during the rise time of the signal $S_1$ or $F_s$. The gate $G_c$ however, is generated at the time that the searching receiver local oscillator signal $LO_s$ is approximately equal in frequency to the tracking receiver local oscillator signal $LO_t$. The coincidence gate $G_2$ is employed to sample the frequency representative signal $F_s$ when the coincidence gate $G_c$ is generated. The output of sampling circuit 426 is indicated as $S_2$ in FIG. 9 directly below the waveform of the coincidence gate $G_c$. Memory circuit 422 shown in the horizontal sweep circuit 420 in FIG. 6 then produces an output signal having a substantially constant level $S_3$ unless the local oscillator frequency $LO_t$ of the tracking receiver 200 shown in FIG. 1 is changed by moving the handwheel 20. This level is indicated also in FIG. 9 directly below the coincidence gate $G_c$ with the frequency representative signal $F_s$ indicated in dotted lines over the output signal $S_3$ of the memory circuit 422. The signal $S_3$ is indicated in dotted lines below the output gate $S_2$ of sampling circuit 426 in FIG. 9 with the output of gate 424 or $S_4$ being indicated in a solid line.

The manner in which mixer 425 mixes the output signals $S_1$ and $S_4$ of gates 423 and 424 respectively, is shown in FIG. 9 directly below the representation of the signal $S_4$ in a solid line. The signal $S_4$ is represented in dotted line below that with the output of mixer 425 or $S_h$ being indicated in a solid line. The display gate $G_f$ of frequency strobe gate generator 441 is shown directly below the horizontal sweep voltage $S_h$. The output of frequency strobe gate generator 431 or $S_5$ is shown. The manner in which the signals $A_s$ and $S_5$ are combined is illustrated at $S_v$ directly below the signal $S_5$ in FIG. 9.

Figure 10:
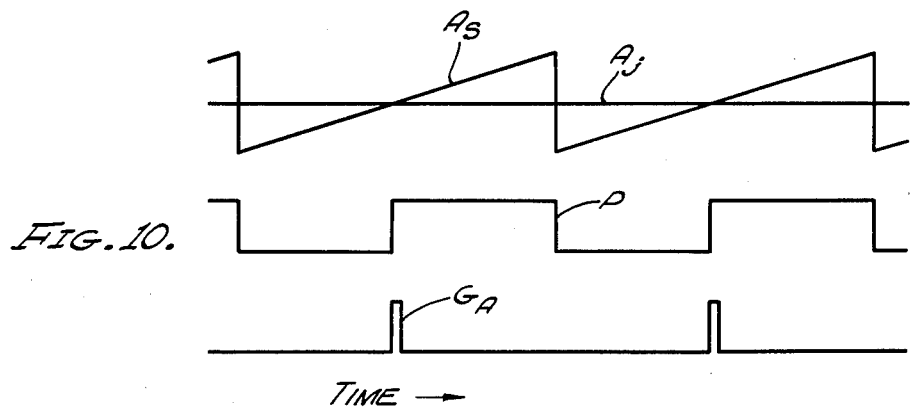
Figure 11:
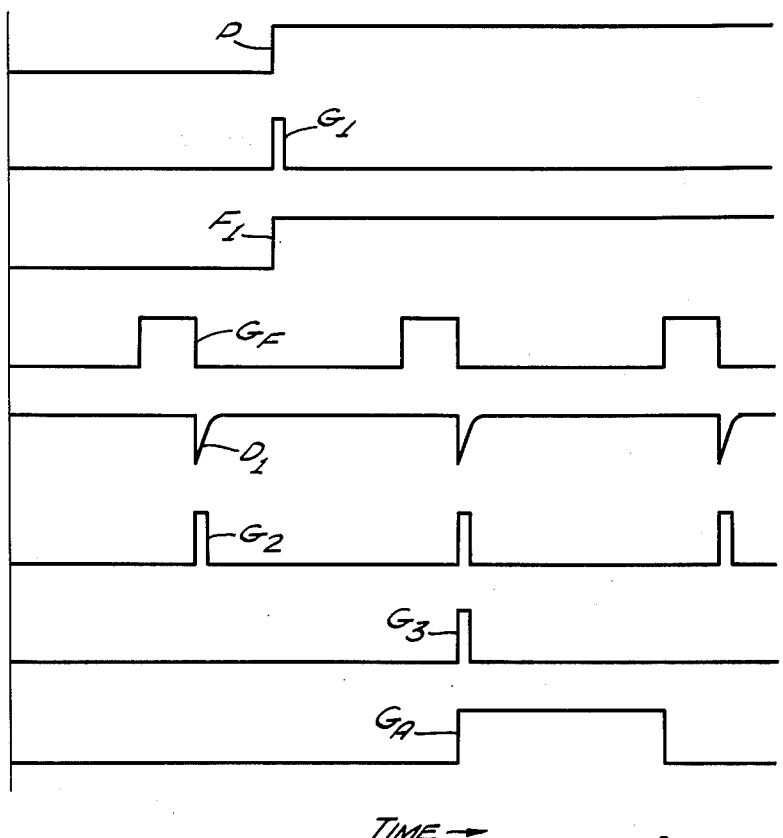

The azimuth representative signals $A_s$ and $A_j$ are shown together in FIG. 10. At the point where $A_s$ becomes equal to $A_j$, a pick-off gate indicated at P below the waveforms of $A_s$ and $A_j$ is generated. This is standardized by the gate generator 445, the flip-flop 446, and gate 447, differentiator and clamp 449, gate generator 448 and azimuth strobe gate generator 443 to produce an azimuth strobe display gate $G_A$ as shown in FIG. 10. The specific manner in which the strobe display gate $G_A$ is generated is better illustrated in the waveform shown in FIG. 11. In this figure the output of the pick-off P is illustrated above a gate $G_1$ generated by gate generator 445 in response to the output P of the pick-off 444. Flip-flop 446 is turned on a time illustrated by the gate $F_1$. The fly-back gate $G_F$ may be generated regularly in the manner shown below the gate $F_1$. The output of differentiator and positive clamp 449 is illustrated below the fly-back gate $G_F$ at $D_1$. The output of gate generator 448 in response to the output signal $D_1$ of differentiator and clamp 449 is shown below the waveform $D_1$. The output of and gate 447 is then illustrated at $G_3$ below the gates $G_2$, and the output of azimuth strobe gate generator 443 or $G_A$ is illustrated below the gate $G_3$. It is to be noted that the gate $G_A$ is generated after the gate $G_1$ is generated but only during a period between the times that the fly-back gate $G_F$ is generated.

It is to be noted that many changes and modifications of the invention will suggest themselves to those skilled in the art. The true scope of the invention, however, is of course not to be limited to the specific embodiments of the invention shown in the drawings, since the true scope of the invention is defined only in the appended claims.

What is claimed is:
1. In a system for countermeasures including a searching receiver having a directional antenna and means for producing first and second output signals with amplitudes respectively changing in proportion to the angular position of the searching receiver directional antenna and the frequency to which the searching receiver is tuned, one of said searching receiver output signals having a period short in comparison to that of the other, said system including at least a tracking receiver having an output signal representative of the frequency to which the tracking receiver is tuned and a jammer transmitter having a directional antenna and an output signal representative of the angular position of the jammer transmitter directional antenna, said system also including a cathode-ray type indicator having an evacuated envelope, an electron gun at one end of the envelope, a luminescent screen at the other end of the envelope, and first and second deflection means for deflecting the cathode-ray across the luminescent screen in two different directions, an arrangement for deflecting the cathode-ray of said indicator across the luminescent screen thereof in a manner to display indicia representative of the frequency and the position of an enemy source of radiant energy, to generate a strobe line representing the frequency to which the tracking receiver is tuned, and to generate a strobe line representing the angular position of the jammer transmitter directional antenna, said arrangement comprising: means for generating a fly-back gate approximately at the end of at least one period of said one searching receiver output signal, means for producing a sample signal proportional to the amplitude of said one searching receiver output signal at a time during said one period when the amplitude of said one searching receiver output signal is proportional to the magnitude of a corresponding one of said tracking receiver and jammer transmitter output signals, means for storing said sample signal until said fly-back gate is generated, means for applying only said one searching receiver output signal to said first cathode-ray deflection means between the times that said fly-back gate is generated and for applying only said stored sample signal to said first deflection means only during the time that said fly-back gate is generated, means for generating a sweep voltage having a period substantially equal to that of said fly-back gate, means for applying said sweep voltage to said second deflection means, said sweep voltage having a range sufficiently large to sweep the cathode-ray of said indicator over a substantial portion of the luminescent screen, means for additionally applying said other searching receiver output signal to said second deflection means, and means for gating the cathode-ray of said indicator on only when said searching receiver receives input signals, when said fly-back gate is generated, and when the amplitude of said other searching receiver output signal becomes proportional to the magnitude of the other of said corresponding tracking receiver and jammer transmitter output signals.

2. In a system for countermeasures including a searching receiver having a directional antenna and means for producing video signals, first and second output signals with amplitudes respectively changing in proportion to the angular position of the searching receiver directional antenna and the frequency to which the searching receiver is tuned, one of said searching receiver output signals having a period short in comparison to that of the other, said system including at least a tracking receiver having an output signal representative of the frequency to which the tracking receiver is tuned and a jammer transmitter having a directional antenna and an output signal representative of the angular position of said tracking jammer directional antenna, said system also including a cathode-ray type indicator having an evacuated envelope, an electron gun at one end of the envelope, a luminescent screen at the other end of the envelope, and first and second deflection means for deflecting the cathode-ray across the luminescent screen in two different directions, an arrangement for deflecting the cathode-ray of said indicator across the luminescent screen thereof in a manner to display indicia representative of the frequency and the position of an enemy source of radiant energy, to generate a strobe line representing the frequency to which the tracking receiver is tuned, and to generate a strobe line representing the angular position of the jammer transmitter directional antenna, said arrangement comprising: means for generating a fly-back gate approximately at the end of at least one period of said one searching receiver output signal, means for producing a sample signal proportional to the amplitude of said one searching receiver output signal at a time during said one period when said one searching receiver output signal is proportional to the magnitude of a corresponding one of said tracking receiver and jammer transmitter output signals, means for storing said sample signal until said fly-back gate is generated, means for applying only said one searching receiver output signal to said first cathode-ray deflection means between the times that said fly-back gate is generated and for applying only said stored sample signal to said first deflection means only during the time that said fly-back gate is generated, means for generating a sweep voltage having a period substantially equal to that of said fly-back gate, means for applying said sweep voltage to said second deflection means, said sweep voltage having a range sufficiently large to sweep the cathode-ray of said indicator over a substantial portion of the luminescent screen, means for additionally applying said other searching receiver output signal to said second deflection means, a gate combining circuit to gate the cathode-ray of said indicator off and on, means for impressing said fly-back gate on said gate combining circuit, means for impressing a display gate on said gate combining circuit when the amplitude of said other searching receiver output signal is proportional to the magnitude of the other of said corresponding tracking receiver and jammer transmitter output signals, a normally operative electronic switch, means for impressing said searching receiver video signals on said electronic switch, means for impressing the output of said electronic switch on said gate combining circuit, and means responsive to said fly-back gate for rendering said electronic switch inoperative.

3. In a system for countermeasures including a searching receiver having a directional antenna and means for producing video signals, a local oscillator signal, and first and second output signals with amplitudes respectively changing in proportion to the angular position of the searching receiver directional antenna and the frequency to which the searching receiver is tuned, said second output signal having a period short in comparison to that of said first output signal, said system also including at least a tracking receiver having a local oscillator signal representative of the frequency to which the tracking receiver is tuned and a jammer transmitter having a directional antenna, a local oscillator, and an output signal proportional in amplitude to the angular position of said jammer transmitter directional antenna, said system also including a cathode-ray type indictor having an evacuated envelope and an electron gun at one end of the envelope, a luminescent screen at the other end of the envelope, and first and second deflection means for deflecting the cathode-ray across the luminescent screen in two different directions, an arrangement for deflecting the cathode-ray of the indicator across the luminescent screen thereof in a manner to display indicia representative of the frequency and position of an enemy source of radiant energy, to generate a strobe line representing the frequency to which the tracking receiver is tuned, and to generate a strobe line representative of the position of the jammer transmitter directional antenna, said arrangement comprising: means for generating a fly-back gate approximately at the end of each period of said searching receiver second output signal, means for generating a coincidence gate each time the searching receiver local oscillator frequency becomes equal to that of the jammer transmitter local oscillator, means responsive to said coincidence gate for producing a sample signal having an amplitude proportional to that of said searching receiver second output signal at the moment said coincidence gate is generated, means for storing said sample signal until said fly-back gate is generated, means for applying only said one searching receiver output signal to said first cathode-ray deflection means between the times that said fly-back gate is generated and for applying only said stored sample signal to said first deflection means only during the time that said fly-back gate is generated, means for generating a sweep voltage having a period substantially equal to that of said fly-back gate, means for applying said sweep voltage to said second deflection means, said sweep voltage having a range sufficiently large to sweep the cathode-ray over a substantial portion of the luminescent screen, means for additionally applying said searching receiver first output signal to said second deflection means, and means for gating the cathode-ray of said indicator on when said searching receiver receives input signals, when said fly-back gate is generated, and when the directional antenna of said searching receiver and said jammer transmitter are in the same angular position.

4. In a system for countermeasures including a searching receiver having a directional antenna and means for producing video signals, a local oscillator signal, and first and second output signals with amplitudes respectively changing in proportion to the angular position of the searching receiver directional antenna and the frequency to which the searching receiver is tuned, said second output signal having a period short in comparison to that of said first output signal, said system also including at least a tracking receiver having a local oscillator output signal representative of the frequency to which the tracking receiver is tuned and a jammer transmitter having a directional antenna, a local oscillator, and an output signal proportional in amplitude to the angular position of said jammer transmitter directional antenna, said system also including a cathode-ray type indicator having an evacuated envelope, an electron gun at one end of the envelope, a luminescent screen at the other end, and vertical and horizontal deflection means for deflecting the cathode-ray across the luminescent screen vertically and horizontally respectively, an arrangement for deflecting the cathode-ray of the indicator across the luminescent screen thereof in a manner to display indicia representative of the frequency and position of an enemy source of radiant energy, to generate a strobe line representing the frequency to which the tracking receiver is tuned, and to generate a strobe line representative of the position of the jammer transmitter directional antenna, said arrangement comprising: means for generating a fly-back gate approximately at the end of each period of said searching receiver second output signal, means for producing a sample signal proportional to the amplitude of said searching receiver second ouput signal at the time that said searching receiver is tuned to the same frequency as that of said jammer local oscillator, means for storing said sample signal until said fly-back gate is generated, a first mixer for impressing a horizontal sweep voltage on the horizontal deflection means of the cathode-ray indicator, a first electronic switch responsive to said fly-back gate for impressing said stored sample signal on said first mixer, a second electronic switch adapted to be rendered inoperative during the time said fly-back gate is generated for impressing said searching receiver second output signal on said first mixer, but only during the time said fly-back gate is not generated, means responsive to said fly-back gate for generating a frequency strobe sweep voltage having a period substantially equal to that of said fly-back gate, a second mixer for applying a vertical sweep voltage to the vertical deflection means of the cathode-ray indicator, means for applying said frequency strobe sweep voltage to said second mixer, means for additionally applying said searching receiver first output signal to said second mixer, and means for gating the cathode-ray of said indicator on only when said searching receiver produces video signals, when said fly-back is generated, and during the full period between the times that said fly-back gate is generated immediately subsequent to the time that the angular positions of said jammer transmitter and searching receiver directional antennas are the same.

References Cited in the file of this patent
UNITED STATES PATENTS
2,496,560    Raymond _____ Feb. 7, 1950